Patented Feb. 25, 1930

1,748,748

UNITED STATES PATENT OFFICE

EDGAR ARTHUR ASHCROFT, OF LONDON, ENGLAND, ASSIGNOR, BY MESNE ASSIGNMENTS, TO THE MAGNESIUM COMPANY LIMITED, OF LONDON, ENGLAND, AN INCORPORATED ENGLISH JOINT-STOCK COMPANY OF LIMITED LIABILITY

TREATMENT OF LEAD-ZINC SULPHIDE ORES, MATTES, AND THE LIKE

No Drawing. Application filed June 28, 1923, Serial No. 648,332, and in Great Britain June 2, 1923.

This invention consists in improvements in the treatment of zinc-lead sulphide ores, concentrates, mattes, oxidized, or sulphated, ores, and like metaliferous materials containing zinc in substantial proportion along with lead, iron and minor proportions of other metals, which, when chlorinated and treated as hereinafter set forth, yield a melt of zinc chloride, or of zinc and lead chlorides, suitable for electrolysis.

One object of this invention is to provide an efficient and economical process for the separation and recovery, from such materials, of zinc and other metallic products and also, if desired, of sulphur. The invention provides an improved method of obtaining, from crude metallic chlorides, a purified melt of zinc chloride, or of zinc and lead chlorides, suitable for electrolysis.

According to this invention the raw metalliferous material is first chlorinated in any usual, or suitable manner, so as to yield a fused mixture of metallic chlorides, the sulphur, or sulphur dioxide, liberated being recovered if desired; the fused mixture is treated with metallic zinc quantitatively so as to precipitate, in the form of a granular metallic mixture, the iron along with the whole, or part, of the lead and minor constituents; the said granular mixture is separated from the melt; and the purified melt, in a fused state, is electrolyzed, (preferably at about 400° to 450° centigrade), for recovery of the metal, or metals, the chlorine evolved being recoverable for re-use. Preferably the electrolysis is effected in a multiple-couple electrolyzer of the type described in the specifications of my United States Letters Patents Nos. 1,545,383 and 1,545,384, both dated July 7, 1925.

The chlorination of the raw metalliferous material may be effected, according to the nature thereof, by means of either chlorine, or chloride of sulphur, in a converter at a temperature of about from 600° to 700° centigrade in any known or suitable manner.

In the case of oxidized, or sulphated, ores it is preferred to mix the ores, prior to treatment in the converter, with a quantity of carbon sufficient to ensure the removal of all oxygen in excess of that expelled in combination with sulphur as sulphur dioxide. Any arsenic, antimony, or tin, present in the material charged into the converter is expelled in the form of chloride, which may, if desired, be condensed and recovered.

The treatment with metallic zinc of the fused chlorides obtained is preferably effected at a temperature of about from 400° to 500° centigrade, the metallic zinc in a molten, or granular, condition being slowly stirred into the melt in quantity just sufficient to precipitate the iron along with the whole, or the requisite proportion, of the lead and the whole, or part, of any silver and copper present. Under these conditions the iron, lead and other metals, are thrown down in the form of a granular metallic mixture which settles rapidly through the melt, and owing to its physical properties, offers other advantages in separating it from the melt and in its subsequent treatment. The properties of such mixtures vary to some extent according to their composition and it is preferred to so conduct the precipitation that the proportion of iron to lead in the precipitate falls within the limits, one of iron to three of lead and one of lead to three of iron.

The purified melt may be separated from the precipitated granular mixture by settlement and decantation, or otherwise, and is then ready for electrolysis. The granular mixture may be washed with water, to remove soluble chlorides, and smelted for the recovery of the lead, silver and other metallic constituents.

The electrolysis of the purified melt may be conducted in one operation, or frictionally, as preferred. In the latter case, if practically the whole of the lead has been precipitated by means of the zinc, the first "cut" or fractionating can be done when a relatively impure grade of zinc, containing the small quantities of lead, copper and other impurities present in the melt, has been deposited, and thereafter zinc of a very high degree of purity is thrown down. If the purified melt contains a substantial proportion of lead chloride, the successive cuts may consist of (1) a fraction containing lead, silver and impurities, (2) pure lead, (3) an alloy of lead and zinc, and (4) pure zinc.

It is preferred to operate this fractionating at a temperature of from about 400° to 450° centigrade in all stages of the process, after the chlorination, when molten zinc chloride is under treatment, as it is found that the melts, while remaining sufficiently fluid and reacting freely in the requisite manner, do not emit fumes when exposed to the atmosphere. They can be manipulated freely and do not attack iron, or steel. Under these conditions, therefore, vessels and agitators made of iron, or steel, are durable, and the melts do not become contaminated.

Example 1

The invention is particularly suitable for the treatment of ores and the like in which zinc is the predominant metal—for example, the commercial product known as "zinc concentrates" obtained from lead-zinc sulphide ore and consisting essentially of a mixture of metallic sulphides. The following is a typical analysis of such concentrates:—zinc 47.7; lead 7.5; iron 8.7; sulphur 26.1; silver 0.043 and copper 0.4 per cent, the remainder being small proportions of other metals, and gangue.

This raw material is chlorinated which can be done by means of chlorine in a converter at about from 600° to 700° centigrade in any known or suitable manner, the sulphur expelled in the gaseous condition being condensed and recovered. The molten mixture of metallic chlorides is transferred from the converter to a precipitating vessel, and metallic zinc in the molten, or granular, condition is slowly stirred into the melt whilst at about from 400° to 450° centigrade in quantity just sufficient to precipitate the iron and lead together with the whole, or part, of the silver and copper. When the granular, metallic mixture has settled, the supernatant zinc chloride is decanted off and subjected to electrolysis at from 400° to 450° centigrade in a multi-couple electrolyzer for the recovery of the zinc as hereinbefore described. The granular mixture is removed from the precipitating vessel and washed with a small quantity of water to remove adherent zinc chloride and is then in suitable condition to be smelted for recovery of the lead, silver and other metals therein. The chlorine liberated during the electrolysis is employed cyclically in the chlorination of further batches of concentrates.

In the case of raw material containing a more considerable proportion of lead than is present in the zinc concentrates hereinbefore referred to, the process of treatment may, if sufficient zinc be present, be similar to that described in the example. With larger proportions of lead it may be advantageous to use, in precipitating the granular metallic mixture of iron and lead, a quantity of zinc sufficient to precipitate only a part of the lead, and the purified melt containing both lead and zinc chlorides may then be electrolyzed either as a whole, to produce an alloy, or fractionally. In the latter case the cuts (or fractionations) may produce a series of fractions as hereinbefore described.

The proportion of iron, copper and other minor constituents, in the melt introduced into the electrolyzer should preferably not exceed about 0.1 per cent of each.

It has been found that manganese chloride, when present in the melt to the extent of from one to five per cent, exerts a beneficial influence during the electrolysis, it apparently tending to keep the lead and zinc chlorides neutral and prevent the formation of basic compounds and silicates of these metals. Therefore if not derived from the materials under treatment, small amounts of manganese may be added in any suitable form and at any suitable stage of the process.

According to a modified form of my invention the raw metalliferous material (other than oxidized, or sulphated, ore) is selectively chlorinated by means of chloride of sulphur at a temperature considerably below 500° C., as described in my United States Letters Patent No. 1,491,653 of April 22, 1924, and the whole product (containing the residual sulphur and chloride of sulphur) is introduced into fused zinc chloride at about from 400° to 450° centigrade. The resultant "sulphochloride" melt may then be treated with metallic zinc to precipitate the lead and iron in the form of the granular unfused metallic mixture aforesaid, leaving a melt suitable for electrolysis. In this case the gaseous product recovered during the electrolysis contains both chlorine and chloride of sulphur. Alternatively, the sulpho-chloride melt may be heated to about 600° to 700° centigrade, for example by feeding it into a previously obtained melt kept at that temperature. An exothermic reaction occurs and sulphur is distilled off, leaving a pure chloride melt which, after precipitation of lead and iron by means of metallic zinc, is subjected to electrolysis.

What I claim is:—

1. In the treatment of metalliferous materials containing zinc in substantial proportions together with lead and iron, the step of subjecting a fused melt of such materials containing chlorides of zinc, lead and iron to the action of metallic zinc quantitatively to precipitate the iron and lead in the form of a granular metallic mixture and separating the said mixture from the melt.

2. In the treatment of metalliferous materials containing crude zinc chloride, together with chlorides of lead and iron, to produce a purified melt of zinc chloride, suitable for electrolysis, the step of subjecting the fused crude chloride at from about 400° to about 500° centigrade to the action of metallic zinc in sufficient quantity to precipitate, in the form of a granular metallic mixture, iron, along with lead, and other constituents the heat of formation of whose chlorides is less than that of zinc chloride, and separating the said mixture from the melt.

3. In the treatment of metalliferous materials containing crude zinc chloride, together with chlorides of lead and iron, to produce a purified melt of zinc and lead chlorides suitable for electrolysis, the step of subjecting the fused crude chloride at from about 400° to about 500° centigrade to the action of metallic zinc in sufficient quantity to precipitate, in the form of a granular metallic mixture, iron, along with lead, and other constituents the heat of formation of whose chlorides is less than that of zinc chloride, and separating the said mixture from the melt.

4. A treatment of metalliferous materials according to claim 1, in which the quantity of zinc added is such that the proportion of iron to lead in the granular metallic mixture is within the limits one of iron to three of lead, and one of lead to three of iron.

In testimony whereof I have signed my name to this specification.

EDGAR ARTHUR ASHCROFT.